June 19, 1923.
C. W. HART
TRACTOR WHEEL FLUKE
Filed March 18, 1920
1,458,937
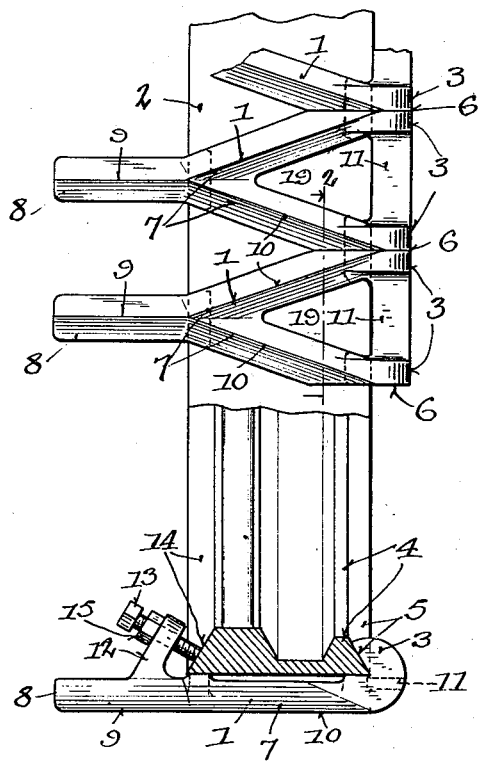
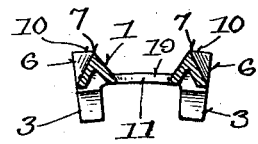
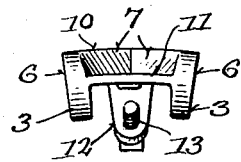
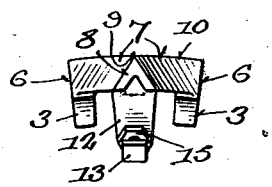
Inventor
Charles W. Hart
By Erwin Wheeler & Woolard
Attorneys.

Patented June 19, 1923.

1,458,937

UNITED STATES PATENT OFFICE.

CHARLES W. HART, OF MILWAUKEE, WISCONSIN.

TRACTOR-WHEEL FLUKE.

Application filed March 18, 1920. Serial No. 366,762.

*To all whom it may concern:*

Be it known that I, CHARLES W. HART, a citizen of the United States, residing at Milwaukee, county of Milwaukee, and State of Wisconsin, have invented new and useful Improvements in Tractor-Wheel Flukes, of which the following is a specification.

My invention relates to improvements in tractor wheels and flukes therefor. My improved fluke is shown but not claimed in a companion application bearing even date herewith, for improvements in tractors.

The object of this invention is to provide a form of cleat grouter or fluke which will be self-clearing in the most sticky soils, and which will cooperate with adjacent flukes in resisting tractive pressure thereby reducing shearing strains on the connections to a minimum.

Also to provide a form of fluke, which can be quickly attached and detached, which will have a three point bearing holding on the wheel rim, ensuring a rigid engagement therewith, and which may be secured in such engagement by a simple clamping member, located in an accessible protected position.

It is also my object to provide means for securely attaching to a wheel rim a series of detachable flukes which will greatly increase the soil engaging area by projecting beyond the wheel rim at one side at least, and which will not only facilitate the lateral discharge of sticky material from the wheel rim between the members of the flukes, but will allow such material to be forced upwardly between the projecting portions at the side or sides of the wheel, whereby these portions of the flukes will always be effective to secure the required degree of tractive pull.

The form of the fluke in cross section is also an important factor in providing members of the required strength and yet obtaining the cutting effect necessary to grip the surface of a hard roadway. In my improved fluke the members are triangular in cross section and this feature combined with the other features above mentioned enables me to equip a wheel with flukes having maximum tractive efficiency under all conditions combined with the distribution of pressure and continuity of pressure which reduces to a minimum the destructive effect of the flukes upon an improved highway.

In the drawings:

Fig. 1 is a plan view partly in section showing a vehicle wheel with a series of my improved flukes attached thereto and showing also the form of the wheel rim.

Fig. 2 is a sectional view of one of the flukes drawn on line 2—2 of Fig. 1.

Fig. 3 is a view of one of the flukes as seen in the inner end.

Fig. 4 is an outer end view.

Each of my improved flukes is provided with a body portion 1 adapted to bear upon the wheel rim 2 near the inner margin thereof. This body portion is formed along its inner margin with depending hook 3 adapted to engage about the inner margin of the wheel rim. In the construction shown, the wheel rim is provided with an inturned portion 4 having a beveled or obliquely disposed face 5 along the surface of which the hook-shaped members 3 may bear.

The sides 6 of the body 1 of my improved fluke are parallel part way across the wheel rim from the inner margin and are then tapered convergingly as shown at 7. The portions 7 comprise ribs terminating in a projecting arm 8 which extends laterally from the wheel rim on the outer side and which is triangular in cross section with one edge or angle 9 projecting in a plane radial to the axis about which the wheel revolves. The converging portions of the body are also triangular in form with one edge or angle 10 projecting and with the bases connected in part by a central web 11.

At or near the junction of the converging portions 7 of the fluke, it is provided with a depending inwardly inclined arm 12 thru which a set screw 13 passes in threaded engagement therewith. The inner end of this set screw bears upon the downwardly and inwardly inclined face 14 of the outer margin of the wheel rim 2, whereby the hook portions 3 of the fluke is drawn forcibly against the inclined face 5 of the rim on the opposite or inner side thereof. A lock nut 15 is employed to hold the set screw after it has once been adjusted.

It will be observed that my improved flukes are mounted upon the wheel with their side margins 6 in contact and with the arms 8 projecting outwardly. Sticky material from the roadway may be forced upwardly between the spaced arms 8 under the pressure of the load, thus causing those portions of the flukes which project beyond the wheel rim to remain free of the material which might otherwise fill the spaces and prevent the flukes from exerting the required traction. It is well known that flukes which do not project beyond the rim of the wheel cannot be so constructed as to avoid filling the spaces with sticky mud under certain conditions so that the wheel assumes a cylindrical form of a diameter equal to the outer edges or margins of the flukes. Therefore, it is of great importance that the flukes be provided with projecting arms extending beyond the rim of the wheel and suitably spaced to allow portions of the soil to pass upwardly between them whereby these portions of the flukes may be kept clear and maintained in an effective condition. I have found that under ordinary conditions the greater supporting surface secured by extending the arms 8 laterally is sufficient to keep the rim 2 from sinking below the level of the ground in soft soil, so that the soil which would ordinarily accumulate between the flukes and pack against the rim is discharged laterally between the arms 9 and beneath the rim 2. The discharging operation is, of course, facilitated by reason of the fact that those portions of the flukes which are in proximity to the rim of the wheel diverge from each other toward the point of discharge.

The triangular form of the projecting arms 8 is also of considerable importance in that cutting edges are thus provided and the required strength maintained. The obliquely extending ribs 7 also facilitate lateral discharge of material which tends to accumulate on the intermediate portions of the wheel rim and these oblique portions also provide for continuous contact of the working edges of the flukes notwithstanding the spaced relation of the arms 8 whereby when the tractor is moving upon a hard surface a continuous rolling contact is obtained.

It will be observed that the engagement of the hooks 3 of each fluke is effectual along the rim for a distance substantially equal to the width of the fluke altho the contact is not necessarily continuous from one side to the other. The engagement of the set screw is substantially at a point along the axis of the fluke and therefore, if the hook has an effective engagement with the rim at two points, one on each side of this axis, it is possible to clamp the fluke securely to the rim with a single set screw, since in effect, a three point engagement is secured. This is of great importance since it makes the cleats or flukes quick detachable.

While I have referred to the arms 8 as triangular in cross section, these arms, and also the ribs 7 need not be solid. In fact I have shown them as having the form of an inverted V to avoid excessive weight. For the same reason, I provide an opening 19 in the web 11, and offset the web and the central portions of the ribs 7 radially to avoid contact with the wheel rim, and ensure a firm seating on the rim at all three corners of the rim engaging portion. It is to be noted that the convergence of the ribs 7 is such to provide a single bearing on the outer surface of the wheel rim directly over the clamping set screw. The converging ribs 7 provide a very effective bracing for the arm 8.

I claim:

1. The combination with a traction wheel rim having inwardly beveled margins, of a series of flukes each hooked at one end to engage one of said margins and provided with a depending portion having a clamping member in position to engage the other margin.

2. The combination with a traction wheel rim having inwardly beveled margins, of a series of flukes each hooked at one end to engage one of said margins and provided with a depending portion having a clamping member in position to engage the other margin, said flukes having relatively wide and narrow portions disposed with the wide portions in abutting contact, along the rim of the wheel and the narrow portions projecting laterally therefrom.

3. The combination with a traction wheel rim, of an annular series of flukes mounted thereon in abutting contact with each other said rim having inwardly beveled margins and each of the flukes having at its inner end a hook-shaped member engaged with the inner margin of the rim and also having an intermediate depending arm provided with a clamping set screw adapted to bear against the other margin of the rim to clamp the fluke in position thereon, each of said flukes being provided with outer end portions which project laterally from the rim of the wheel and are relatively narrow and out of contact with the corresponding portions of the adjacent fluke.

4. A wheel fluke provided with separated bearing surfaces adapted to rest upon the periphery of a wheel, means adjacent certain of said surfaces for interacting with the wheel to draw said bearing surfaces into contact with the wheel, and means adjacent another bearing surface adapted to engage the wheel to effect said interaction and to draw said last named surface into contact.

5. The combination with a wheel, of a series of similar flukes, each including diverging arms with an apex near one side of the wheel and adapted to contact at their divergent ends with the arms of the next flukes in the series.

6. The combination with a tractor wheel, of a series of Y-shaped flukes disposed transversely about the periphery of the wheel and having their divergent arms conforming to the arc of said periphery.

7. A wheel fluke having relatively wide and narrow end portions and a length greater than the width of the wheel rim for for which the fluke is designed, said fluke having radially converging surfaces forming biting edges for engagement with the roadway.

8. The combination with a tractor wheel, of a series of Y-shaped flukes disposed transversely about the periphery of the wheel, the diverging arms of the flukes being of a length sufficient to reach from one side of the wheel to the other.

9. A wheel fluke adapted to engage a wheel rim at only three separate points, and clamping means adapted to act upon said rim to draw the fluke into close contact with the rim at all three points.

10. A wheel fluke having relatively wide and narrow end portions provided with hook-shaped members on the wide portion adapted to engage a wheel rim at points separated by a distance approximating the width of said portion of the fluke and a depending arm connected with an intermediate portion of the fluke and provided with a clamping set screw substantially at the axis of the fluke and in a position to engage the opposing margin of the rim to draw said hook into forcible engagement and clamp the fluke to the rim substantially as set forth.

11. A wheel having a series of abutting flukes each having at one end a relatively wide rim engaging portion provided with ribs which extend obliquely from its side margins to an apex laterally offset from the central plane of the wheel, and forming apices with the ribs of adjacent flukes.

12. A wheel having a series of abutting flukes each having at one end a relatively wide rim engaging portion provided with ribs which extend obliquely from its side margins to an apex laterally offset from the central plane of the wheel, and forming apices with the ribs of adjacent flukes, each fluke having a ribbed arm extending laterally from the wheel and from the first mentioned apex.

13. A wheel fluke having a ribbed outer surface, and adapted for only a three point bearing engagement with the outer surface of a wheel rim, and means for clamping the same to the rim.

14. A wheel fluke having a ribbed outer surface, and adapted for a three point bearing engagement with the outer surface of a wheel rim, means for clamping the same to the rim, including a pair of rim engaging members at the inner end of the fluke, and a clamping member adapted to releasably engage the opposite side of the rim in a transverse line extending between said rim engaging members.

15. The combination with a traction wheel rim, of a series of flukes provided with wedging hooks adapted to engage one margin of the rim with a clamping action, and means for clamping each fluke to the other side of the rim and actuating said hooks to clamping position.

16. A wheel fluke having relatively wide and narrow end portions and a length greater than the width of the wheel rim for which the fluke is designed, said fluke having its outer surface provided with converging ribs on its wider portion, and a rib on its narrower portion extending from the apex of the convergent ribs, each of said ribs being triangular in cross section with one edge or angle projecting radially and adapted to grip the roadway.

17. A wheel fluke provided with peripherally spaced bearing surfaces, a hook adjacent each such surface engageable with the margin of a wheel, a separate bearing surface transversely remote from said first mentioned bearing surfaces, and a set screw adjacent said separate surface and adjustable with reference to said fluke to and from a wheel, said set screw being adapted by its angle to draw said hooks and said separate bearing surface simultaneously into engagement with the wheel.

18. A wheel fluke including two divergent arms having bearing lugs adjacent their extremities, hooks carried by said arms and arranged for interaction with the margin of a wheel periphery whereby transverse relative movement between said fluke and periphery may be utilized to bring said lugs into contact, a set screw associated with said fluke and adjustable into contact with a wheel to produce said relative transverse movement, and a bearing surface adjacent said screw and adapted, by the operation thereof, to be forced into contact with said wheel.

19. A tractor wheel provided with a rim in combination with fluke elements detachably associated with said rim and including ribs disposed in zig-zag pattern about the periphery of said rim forming alternately inner and outer apices, and a rib projecting laterally from each of said outer apices beyond the rim of said wheel, whereby to provide additional support for said wheel and permit the ejection of soil from between said divergent ribs.

In testimony whereof I affix my signature in the presence of two witnesses.

CHARLES W. HART.

Witnesses:
LEVERETT C. WHEELER,
O. C. WEBER.